(12) United States Patent
Klapman et al.

(10) Patent No.: US 11,741,214 B2
(45) Date of Patent: Aug. 29, 2023

(54) PASSCODE AUTHENTICATION BASED DATA STORAGE DEVICE

(71) Applicant: Western Digital Technologies, Inc., San Jose, CA (US)

(72) Inventors: Matthew Harris Klapman, San Jose, CA (US); Brian Edward Mastenbrook, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 32 days.

(21) Appl. No.: 17/362,809

(22) Filed: Jun. 29, 2021

(65) Prior Publication Data
US 2022/0414205 A1 Dec. 29, 2022

(51) Int. Cl.
| | |
|---|---|
| G06F 3/06 | (2006.01) |
| G06F 13/38 | (2006.01) |
| G06F 13/42 | (2006.01) |
| G06F 21/79 | (2013.01) |
| H04L 9/06 | (2006.01) |
| H04L 9/12 | (2006.01) |
| G06F 21/45 | (2013.01) |
| G06F 21/35 | (2013.01) |
| G06F 1/12 | (2006.01) |
| G06F 21/62 | (2013.01) |

(Continued)

(52) U.S. Cl.
CPC .............. *G06F 21/45* (2013.01); *G06F 1/12* (2013.01); *G06F 3/0622* (2013.01); *G06F 3/0655* (2013.01); *G06F 3/0679* (2013.01); *G06F 13/382* (2013.01); *G06F 13/4282* (2013.01); *G06F 21/35* (2013.01); *G06F 21/602* (2013.01); *G06F 21/62* (2013.01); *G06K 19/06037* (2013.01); *H04L 9/0819* (2013.01); *H04L 9/0863* (2013.01); *G06F 2213/0042* (2013.01)

(58) Field of Classification Search
CPC .......... G06F 21/45; G06F 1/12; G06F 3/0622; G06F 3/0655; G06F 21/35; G06F 21/602; G06F 21/62; G06F 2213/0042; G06F 3/0679; G06K 19/06037; H04L 9/0819; H04L 9/0863
See application file for complete search history.

(56) References Cited

U.S. PATENT DOCUMENTS 7,814,321 B2 10/2010 Challener et al.
9,830,445 B1 * 11/2017 Machani ................. G06F 21/32
(Continued)

OTHER PUBLICATIONS

International Search Report and Written Opinion for International Application No. PCT/US2022/017179, dated Jun. 9, 2022, 12 pgs.

*Primary Examiner* — Joseph P Hirl
*Assistant Examiner* — Aayush Aryal
(74) *Attorney, Agent, or Firm* — Patent Law Works, LLP

(57) ABSTRACT

Data storage devices, methods, and systems for passcode authentication based on automatically generated and dynamically changing unlock passcodes are described. An access controller of a data storage device is configured to receive a first passcode based on an externally generated input passcode that is synchronized with internal generation of an unlock passcode by the access controller. The access controller generates a second passcode based on the internally generated unlock passcode, and unlocking the data storage device is responsive to the first passcode matching the second passcode.

21 Claims, 6 Drawing Sheets

(51) Int. Cl.
    *G06F 21/60*       (2013.01)
    *H04L 9/08*        (2006.01)
    *G06K 19/06*      (2006.01)

(56) References Cited

U.S. PATENT DOCUMENTS

| | | | |
|---|---|---|---|
| 2006/0083228 A1* | 4/2006 | Ong | H04L 63/0823 |
| | | | 370/389 |
| 2007/0133591 A1* | 6/2007 | Shatford | H04L 63/0442 |
| | | | 370/395.2 |
| 2007/0300052 A1* | 12/2007 | Jevans | G06F 21/41 |
| | | | 713/1 |
| 2009/0113543 A1* | 4/2009 | Adams | H04L 9/3271 |
| | | | 726/20 |
| 2009/0138727 A1* | 5/2009 | Campello de Souza | |
| | | | G06F 21/80 |
| | | | 713/193 |
| 2016/0110534 A1* | 4/2016 | Taratine | G06F 21/35 |
| | | | 726/9 |
| 2017/0063531 A1* | 3/2017 | Sullivan | G06F 21/6209 |
| 2017/0161518 A1* | 6/2017 | Khassanov | G06F 21/602 |
| 2017/0223014 A1* | 8/2017 | Roth | H04W 12/06 |
| 2018/0053018 A1* | 2/2018 | Baskaran | G06F 21/62 |
| 2021/0173944 A1 | 6/2021 | Mastenbrook et al. | |
| 2022/0022034 A1* | 1/2022 | Tachibana | H04W 12/0431 |

\* cited by examiner

PASSCODE AUTHENTICATION BASED DATA STORAGE DEVICE

TECHNICAL FIELD

This disclosure relates to a data storage device that can be unlocked via passcode based authentication of a user of the data storage device.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the system. From the perspective of the computing system, a DSD is typically implemented as a block storage device where the data stored is in the form of one or more blocks, being sequences of bytes or bits having a maximum length, referred to as block size.

External DSDs are commonly used to supplement the data storage capabilities of a computer system. For example, external DSDs are often standalone physical devices which house an internal storage component, such as a hard disk drive (HDD) or a solid state drive (SSD), that provides a host computing system with an additional portion of non-volatile memory (i.e., the volume of the drive) in which to store digital data. These external drive type devices are connectable to the host computer system via a data path operating over a particular connectivity protocol (e.g., via Universal Serial Bus (USB) cable). In response to being connected to the host computer system, the host computer system recognizes the external drive as a block data storage device such that a user of the device may access the storage of the drive via the data path (e.g., through operation of the host computer). Access to the drive typically enables a user to access (e.g., read, write and/or modify) user data content stored on the drive.

It is desirable to secure the user data content of a data storage device against access by unauthorized parties. However, the use of encryption methods often leads to technically complex and cumbersome solutions.

SUMMARY

Disclosed herein is a data storage device comprising a data path and an access controller. The data path comprises a data port configured to transmit data between a host computer system and the data storage device, wherein the data storage device is configured to register with the host computer system as a block data storage device; a non-volatile storage medium configured to store user content data. The access controller is configured to: repeatedly and automatically generate a dynamically changing unlock passcode for unlocking the data storage device; receive a first passcode including, at least, an input passcode provided by a user device external to the data storage device, wherein the input passcode is generated externally to the data storage device and synchronously with the generation of the unlock passcode by the access controller; and provide access to the user content data via the data port in response to the first passcode matching with a second passcode generated by the access controller, wherein the second passcode includes at least the unlock passcode.

In some embodiments, the second passcode further includes a predetermined passcode of the data storage device.

In some embodiments, the predetermined passcode of the data storage device is selectively set by a user of the user device.

In some embodiments, the input passcode is generated by the user device.

In some embodiments, the access controller generates the unlock passcode as a time-based one-time passcode based on a passcode generation key and a reference time value.

In some embodiments, the access controller is further configured to share the passcode generation key by sending the passcode generation key over a wireless communication channel via a protocol such as NFC or Bluetooth.

In some embodiments, the access controller is further configured to share the passcode generation key by displaying a QR code encoding the passcode generation key on a display of the data storage device.

In some embodiments, the access controller is further configured to perform a time synchronization operation to align the time reference value of the access controller with a corresponding time reference value of the user device associated with the data storage device.

In some embodiments, aligning the respective time reference values of the access controller and the user device involves: setting the reference time value of the access controller to a current time value of the user device, wherein the access controller is configured to receive the current time value within a synchronization message transmitted to the data storage device.

In some embodiments, aligning the respective time reference values of the access controller and the user device involves: setting the reference time value of the access controller to a real-time dynamically determined time value; and generating a time indication signal that automatically causes the user device to set the reference time value of the user device associated with the data storage device to the same dynamically determined time value.

In some embodiments, generating the time indication signal comprises changing an on/off status of an optical or acoustic emitter.

In some embodiments, performing the time synchronization operation comprises a unidirectional data transfer from the data storage device to the user device.

In some embodiments, the access controller is further configured to receive the input passcode from the user device or the host computer system.

In some embodiments, the access controller is further configured to: selectively set a data access state of the data storage device to either: an unlocked state to enable transmission of the user content data between the host computer system and the non-volatile storage medium; or a locked state to disable transmission of the user content data between the host computer system and the non-volatile storage medium, and wherein, providing access to the user content data via the data port involves setting the data access state of the data storage device to the unlocked state.

In some embodiments, the data path comprises a cryptography engine connected between the data port and the storage medium and configured to: use a decryption key to selectively decrypt encrypted user content data stored on the storage medium, wherein the access controller provides the decryption key to the cryptography engine.

In some embodiments, the cryptography engine is further configured to use an encryption key to selectively encrypt one or more of: the user content data stored on the storage medium; and data received from the data port to be stored as user content data on the storage medium, wherein the access controller provides the encryption key to the cryptography engine.

In some embodiments, the encryption key and the decryption key are the same key.

In some embodiments, the access controller is configured to: repeatedly and automatically generate an unlock key by encrypting the encryption key using the currently generated unlock passcode of the data storage device; generate the decryption key by decrypting an unlock key of the data storage device using the received input passcode; cause the decryption key to be used in a decryption function of the data storage device to apply the decryption function to, at least, a portion of the encrypted user data; and return a result of the decryption function to the host computer system via the data port, wherein the encrypted user data is encrypted by using the encryption key in a corresponding encryption function of the data storage device.

Disclosed herein is a method for accessing data on a data storage device, the method comprising: repeatedly and automatically generating a dynamically changing unlock passcode for unlocking the data storage device; receiving a first passcode including, at least, an input passcode provided by a user device external to the data storage device, wherein the input passcode is generated externally to the data storage device and synchronously with the generation of the unlock passcode by the data storage device; and provide access to the user content data via a data port of the data storage device in response to the first passcode matching with a second passcode generated by the data storage device, wherein the second passcode includes at least the unlock passcode.

Disclosed herein is a data storage device, comprising: means for repeatedly and automatically generating a dynamically changing unlock passcode for unlocking the data storage device; means for receiving a first passcode including, at least, an input passcode provided by a user device external to the data storage device, wherein the input passcode is generated externally to the data storage device and synchronously with the generation of the unlock passcode by the data storage device; means for providing access to the user content data via a data port of the data storage device, the access being provided in response to the first passcode matching with a second passcode generated by the data storage device, wherein the second passcode includes at least the unlock passcode.

BRIEF DESCRIPTION OF DRAWINGS

One example will be described with reference to the accompanying drawings, wherein.

DESCRIPTION OF EMBODIMENTS

One option for securing used data on a data storage device (DSD) is the use of a passcode, which remains the same until the user changes it. This is referred to as a "static passcode". There are particular shortcomings of data storage devices that use static passcodes to perform authentication of users. Under this approach the unlock passcode remains the same for extended periods of time as there is no incentive for the user to change the code. This leads to an increased risk of the code being compromised by, or otherwise exposed to, an unauthorized third party who may consequently obtain access to the data stored on the device. This risk is amplified when a single data storage device is shared between multiple users. In this case, one user (e.g., the owner or primary user of the device) communicates the unlock code to one or more other users in an unsecure manner. For example, it is possible that a user makes a written copy of the device unlock PIN for the purpose of providing this copy to another user together with the device (e.g., by affixing the written copy to the housing of the device).

Figure 1A:
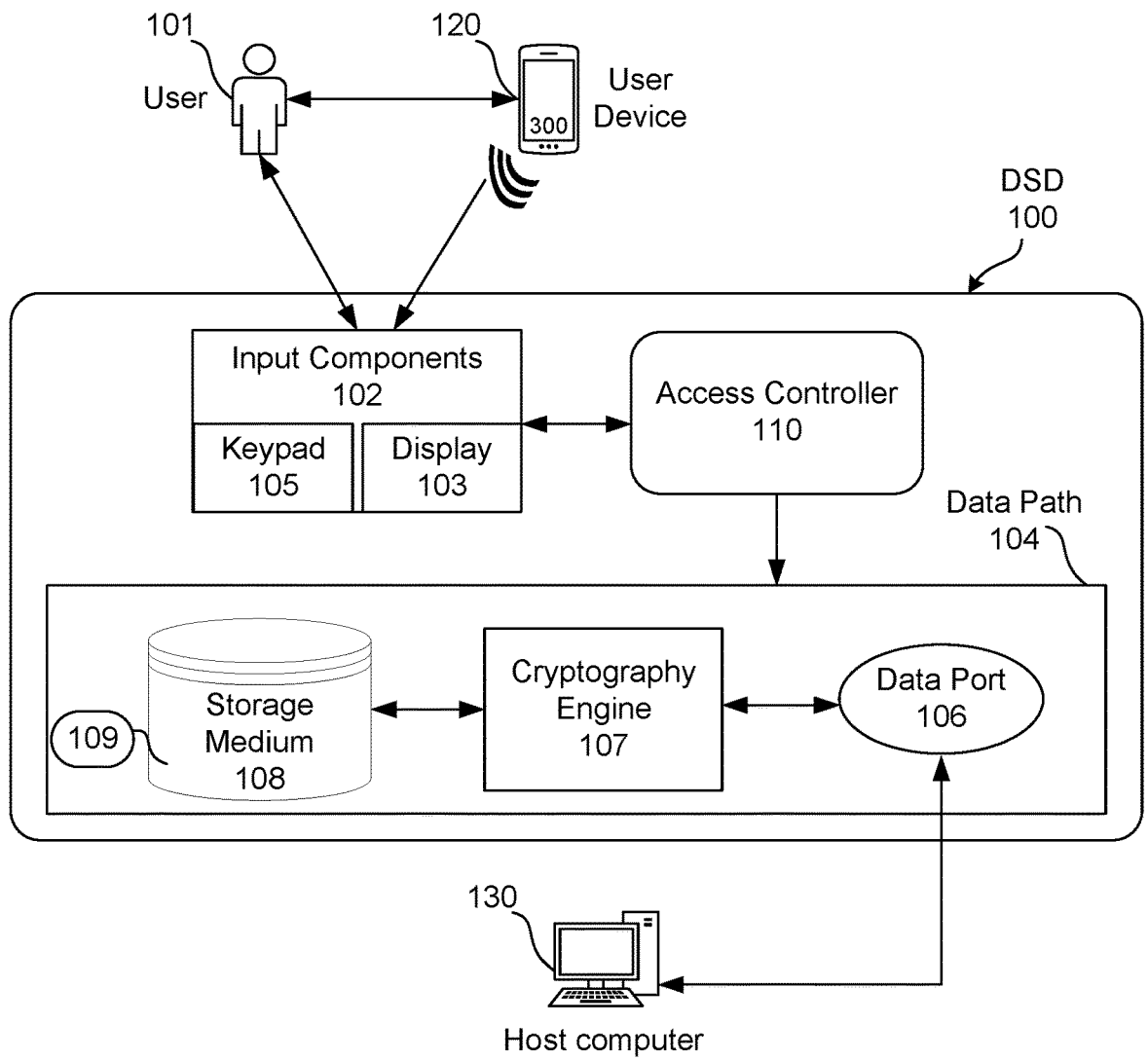
FIG. 1a illustrates an example data storage device (DSD) according to one embodiment.

With reference to FIG. 1a, there is disclosed an exemplary data storage device (DSD) 100 that provides a user 101 of the device with access to user content data 109 stored thereon using passcode based authentication according to one embodiment. DSD 100 receives a passcode provided by the user 101, and provides the user access to the data 109 on a positive match between the received (first) passcode and a (second) passcode of the DSD 100, such as by generating a decryption key or enabling access operations. However, unlike conventional approaches to passcode based authentication for data storage devices, the second passcode includes an unlock passcode that is automatically and repeatedly generated by one or more internal components of the DSD 100. That is, the unlock passcode dynamically changes, either automatically over time or in response to a triggering event. In the examples described herein, the second passcode generated by the DSD 100 includes only the dynamically changing unlock passcode that is matched to a corresponding "input" passcode constituting the received first passcode. The input passcode is generated externally to the data storage device and synchronously with the generation of the unlock passcode by the access controller.

However, in other embodiments the second passcode further includes a predetermined passcode of the data storage device. In such embodiments, the second passcode may be generated by combining the predetermined passcode with the dynamically generated unlock passcode, as such for example by appending the predetermined code to the unlock code. To match the second passcode, the received first passcode is a corresponding combination of a static passcode with the generated input passcode. Such embodiments are advantageous in that they provide a type of two-factor authentication, where the combined passcode enabling access to the stored user data may remain secure even in the case that the dynamic code generation process is compromised (i.e., since the unauthorized party would still need to obtain the fixed predetermined code).

Furthermore, the input passcodes of the user 101 are determined from a user device 120 that is external to the data storage device 100. The external user device 120 may be a mobile computing device, configured to execute a software application 300 that facilitates the determination of the input passcode for the user 101, as depicted in FIG. 1*a*. The data storage devices and data access methods disclosed herein are advantageous in that access to user content data is permitted based on the use of the dynamically changing unlock code. This enhances the security of the storage device by reducing the reliance on static forms of authentication data, such as for example PINs or passcodes that remain constant unless explicitly modified by a user operation, and which are consequently vulnerable to exposure and use by an unauthorized party.

In some examples, the user device 120 determines the input passcode, to be entered by the user into the DSD, by retrieving the input passcode or a seed value to generate the input passcode from a remote location, such as a passcode server. In other examples, the user device 120 determines the input passcode by generating the input passcode locally on the user device 120. In the latter case of local generation, synchronization of the DSD 100 with the user device 120 can be achieved by sharing a secret passcode generation key and a reference time value, as described below. In addition to the automatic generation of unlock codes over time, the unlock code can be changed in response to a code triggering event involving the transmission of code triggering data from the DSD 100 to the user device 120. In the described examples, the unlock passcode and corresponding input passcode are generated as time-based one-time passcodes (TOTPs) by the DSD 100 and the user device 120 respectively.

The synchronization process enables an authorized user (e.g., user 101) to dynamically generate input passcodes that match to the unlock passcodes that are repeatedly and automatically generated the DSD 100. In this way, the data storage device 100 provides the authorized user 101 with secure access to the user content data 109 while ensuring that the vulnerability of each particular generated unlock code is small (i.e., since the code is only valid for a short time window before its expiry). Further, the user 101 can configure user device 120 such that a secure authentication of the user 101, such as a fingerprint to unlock user device 120, is required before the user device 120 reveals the input passcode. As a result, even a stolen user device 120 will not enable an attacker to access the user data. Therefore, the data storage devices described herein provide an improved solution for securing user data against the vulnerabilities of using static authentication codes, while permitting controlled time-based access to user content, and without requiring the exchange of data between a storage device and a computer system (e.g., host computer 130) to perform the authentication.

Lockable Data Storage Device

FIG. 1*a* shows an embodiment of the DSD 100 comprising a data path 104 and an access controller 110. The data path 104 comprises a data port 106 configured to transmit data between a host computer system 130 and the DSD 100. In some embodiments, the data port 106 includes control operations to translate interface protocols (e.g., USB to NVMe), and to provide other general device functionality. It may also transform a static password and TOTP into a key to be fed into the cryptography engine 107 (described below).

The DSD 100 is configured to register with the host computer system 130 such as to provide functionality to the host computer system 130 of a block data storage device. DSD 100 further comprises storage medium 108 to store user content data 109. The user content data 109 includes one or more blocks of data organized into files, for example including images, documents, videos, etc., according to a particular file system operable by the host computer 130. The storage medium 108 is non-transitory such as to retain the stored block data irrespective of whether the medium 108 is powered. The medium 108 may be a solid state drive (SSD), hard disk drive (HDD) with a rotating magnetic disk, or any other non-volatile storage media. Further, the storage medium 108 may be a block data storage device, which means that the user content data 109 is written in blocks to the storage medium 108 and read in blocks from the storage medium 108.

The DSD 100 includes a cryptography engine 107 configured to receive, interpret and execute commands received from host computer system 104 according to a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI), NVMe, I2C, and other proprietary architectures. The cryptography engine 107 is connected between the data port 106 and the storage medium 108 and is configured to use a cryptographic key to encrypt user content data 109 to be stored on the storage medium 108, and to decrypt the encrypted user content data 109 stored on the storage medium 108 in response to a request from the host computer system 130.

The access controller 110 is configured to provide access to the user content data 109 via the data port 106. That is, the access controller 110 issues commands to the data path components to cause the cryptography engine 107 to control the cryptographic state of the user content data 109 (i.e., encrypted or plain). For example, the access controller 110 may provide a key to the data port 106, which the data port 106 then forwards to the cryptography engine 107 via a SECURITY SET PASSWORD command of the ATA SECURITY feature set.

As an alternative, or in addition to the above cryptography example, DSD 100 may also have a physical enable signal that sets a data access state. The access controller 110 is configured to set the enables signal to selectively set the data access state of the device 100, to either: an unlocked state to enable transmission of user content data 109 between the host computer system 130 and the storage medium 108; or a locked state to disable transmission of user content data 109 between the host computer system 130 and the storage medium 108. In that example, the user content could be stored in plain text, that is unencrypted, and it is only the enable signal for the physical access that determines whether the user content data is accessible. That is, the data access state determines whether data may pass through the data path 104 to the host computer 130, where a locked data access state prevents such an exchange (i.e., such that the host computer 130 does not have any logical access to the internal storage drive). In the unlocked state, data may pass through the data path 104 to the host computer 130 via the data port.

The DSD 100 also has a cryptographic state representing whether or not the user content data 109 is stored in an encrypted state within the storage medium 108. The cryptographic state is determined by the cryptography engine 107 which uses a cryptographic key to selectively: i) decrypt the user content data 109 stored on the storage medium 108, in response to a cryptographic state of the DSD 100 being set to an unencrypted state; and ii) encrypt one or more of: the user content data 109 stored on the storage medium 108; and data received from the data port 106 to be stored as user content data 109 on the storage medium 108, in response to a cryptographic state of the DSD 100 being set to an encrypted state. The access controller 110 provides the cryptographic key to at least one component of data path 104 and therefore directs the encryption or decryption of the user content data as part of its control functionality. In one example, the cryptography engine 107 encrypts the user content data "on the fly" as it passes through cryptography engine 107 from data port 106 to storage medium 108, and decrypts the encrypted user content data "on the fly" as it passes through the cryptography engine 107 from storage medium 108 to data port 106. Again, the access controller 110 provides the correct key used for the decryption to the cryptography engine 107 in response to the user entering an input passcode that matches the passcode generated by the DSD 100.

In some embodiments, the cryptography engine 107 is configured to be "always active" such as to perform encryption with a default key stored in the DSD 100. The purpose of this is to whiten the data (i.e., to provide an even distribution of 1s and 0s) for the data stored in the storage medium 108. To the user 101, whitening causes the data of storage medium 108 to appear as non-encrypted irrespective of the cryptographic state. In response to the cryptographic state being set to the encrypted state, a secret key is substituted for the default key. This always on functionality can be implemented for the whole of a drive of medium 108 or a portion (partition) of the drive. Furthermore, the cryptography engine 107 may use different keys to encrypt different partitions (i.e., several virtual storage units on a single storage medium 108).

The cryptographic state may be independent of the data access state. That is, the DSD 100 may be "unlocked" enabling transmission of data through the path 104, while the cryptographic state is set to "encrypted" such that the data retrieved from, and stored into, the storage medium 108 is an encrypted representation. Conversely, in response to the cryptographic state being set to "unencrypted" the data retrieved from, and stored into, the storage medium 108 is plain unprotected representation of the user content data 109.

In the disclosure herein, the control of access to user content data 109 refers to the selective setting of the data access state by the access controller 110 of the DSD 100 (i.e., the control of whether the host 130 can exchange data in any form, encrypted or plain, with the device 100). That is, the DSD 100 is "locked" or "unlocked" in accordance with the corresponding data access state. In other embodiments, the DSD 100 may be considered to be "unlocked' if user content data 109 is both stored in a plain (i.e., unencrypted) state, and accessible via transmission through the data path 104 (i.e., based on both the data access and cryptographic states).

The access controller 110 controls access of the user 101 to the user content data 109 based on an authentication system. That is, in order to access the stored user data 109 the user 101 authenticates themselves with the DSD 100 via the use of an input passcode which is entered into the DSD 100 via input components 102. In the embodiments discussed, input components 102 include a keypad 105, or a similar arrangement of mechanical components that collectively enable the selection of digits or characters for the purpose of forming the desired input passcode and entering the code into the device 100. Alternatively, the host computer 130 can provide the input passcode into DSD 100, such as via an interactive application (such as software application 300, as described below for execution by the user device 120). For example, the application may be configured to obtain the input passcode from one of more of the following operations: accepting input provided by user 101; retrieving input passcode data from a remote server; and generating the input passcode data, based on the data that is provided by the user, retrieved from the server, or provided by the application itself.

The input components 102 may include a wireless modem configured to receive and transmit data wirelessly via the transmission of an electronic message in a predetermined form. For example, this enables the DSD 100 to receive input passcode data from a user device, and to transmit shared secret key data to the user device as described herein below. In response to a data entry operation by user 101, the input components 102 are configured to receive an input passcode and to generate received input passcode data (representing the input code) for transmission to the access controller 110. In some embodiments, the DSD 100 also includes a display 103 coupled to the access controller 110 to display textual and/or graphical content to the user 101. The display 103 may be optionally coupled to, or integrated with, the input components 102 (e.g., in the case of the device 100 including a touchscreen).

Figure 1B:
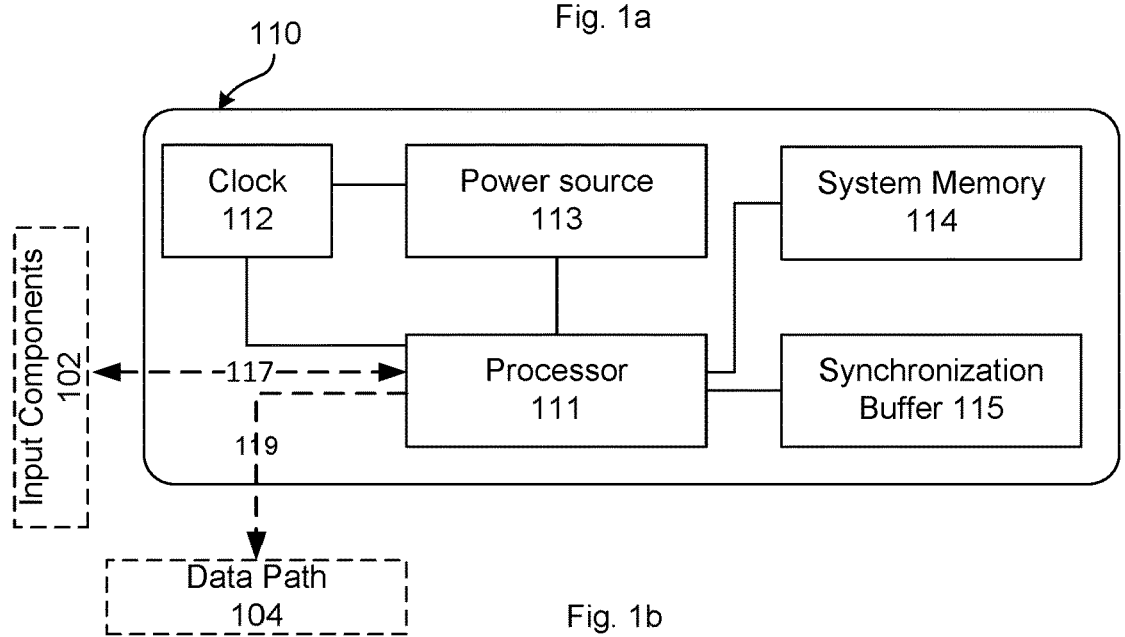
FIG. 1b illustrates a block diagram of an access controller of the example data storage device (DSD) according to one embodiment.

FIG. 1b illustrates an exemplary embodiment of the access controller 110 which includes: a processor 111; a clock 112 in communication with the processor 111; memory modules in the form of a system memory 114 and synchronization buffer 115 configured to exchange data with the processor 111 and a power source 113 in the form of an internal battery configured to power, at least, the processor 111 and the clock 112. Data flows 117 and 119 exist between the processor 111 and the input components 102 and the data path 104 respectively. The processor 111 is configured to execute program code stored within the system memory 114 to issue commands for controlling the operation of the DSD 100. The system memory 114 also stores device specific data, including at least a unique identifier of the DSD 100 referred to as the device identity key (IDK).

Synchronization buffer 115 is configured to store authentication data of the device 100, including the unlock passcode data representing the unlock passcode for unlocking the DSD 100, or seed values to generate the unlock passcode when executed by processor 111 together with input components 102. Synchronization buffer 115 is also configured to store synchronization data including: a shared passcode generation key; and a reference time value. The synchronization data also includes the parameter values used to generate the unlock passcode as a TOTP according to the methods disclosed herein. In some embodiments, the synchronization buffer 115 may be a partitioned area of system memory 114. In other embodiments, the buffer 115 may reside in a separate memory area, such as a portion implemented in dedicated hardware modules, such as one or more caches, registers, or a combination of these.

Processor 111 receives a clocking signal from clock 112, which is processed to produce timestamp values representing instants in real-time. Processor 111 is configured to repeatedly and automatically generate a dynamically changing passcode (the "unlock passcode"), which is a time-varying code used for unlocking the data storage device 100, by processing the stored passcode generation key and reference time value. The reference time value is determined based on a time value obtained periodically from the clock 112 (i.e., to calculate a time differential, as described herein below). Processor 111 repeats the generation of a new passcode in response to a predefined time period value having expired, such as every 5 minutes, 30 minutes, 1 hour, 12 hours or any other time value. User device 120 is synchronized and therefore also generates new passcode at the same times.

Processor 111 is configured to receive input data from data path 104 and input components 102 via flows 119 and 117 respectively. For example, processor 111 receives data representing a first passcode entered into the DSD 100, including an input passcode, as generated by the input components 102. As disclosed herein, the input passcode is provided by a user device external to the data storage device 100, where the input passcode is generated externally to the data storage device and synchronously with the generation of the unlock passcode by the access controller 110. Processor 111 generates and transmits control signals to the input components 102 to manage one or more user interface (UI) elements of the components (e.g., keypad and feedback LEDs). The processor 111 also generates control signals to control the operation of the data path 104, including the cryptographic functions of engine 107 for encrypting or decrypting data including stored user content data 109.

In response to the first passcode matching with a second passcode, the second passcode being generated by the access controller 110 and including at least the unlock passcode, the access controller 110 provides access to the user content data 109 via the data port 106. That is, in this case the user providing the input passcode is considered as an authorized user of the DSD 100. In the described examples, the first and second passcodes are formed exclusively from the input and unlock codes respectively. However, in other embodiments the processor 111 may be configured to perform a combination operation to combine the dynamically generated input and unlock codes with respective predetermined fixed codes supplied by the user and maintained by the DSD 100. The combination operation may include appending the predetermined and dynamic code components to form the first and second codes referred to in the matching.

User 101 determines the input passcodes for entry into the DSD 100, via the input components 102, using an external device 120. In the described embodiments, the external device 120 is a mobile computing user device, such as a smart phone or tablet. The user device 120 is configured to execute a data storage device management application (DSDMA) 300, which may be: a mobile application in the form of a dedicated software program obtainable from a digital distribution platform that provides applications for an operating system executing on the device (e.g. Google Play Store or Apple Store). Alternatively, the application 300 may be a generic software application, such as a web browser configured to render one or more webpages hosted by a dedicated web server (e.g., as provided by the manufacturer of the DSD 100), or as a general purpose password management or token authenticator application (e.g., the Google Authenticator application). In other embodiments, the application 300 executes on the host computer 130 and functions to transmit an input passcode to the access controller 110 via the data port 106 in response to generating the input passcode, or otherwise obtaining the input passcode (e.g., from the user 101, a remote server, or a combination of both).

User Device Based Authentication

Figure 2:
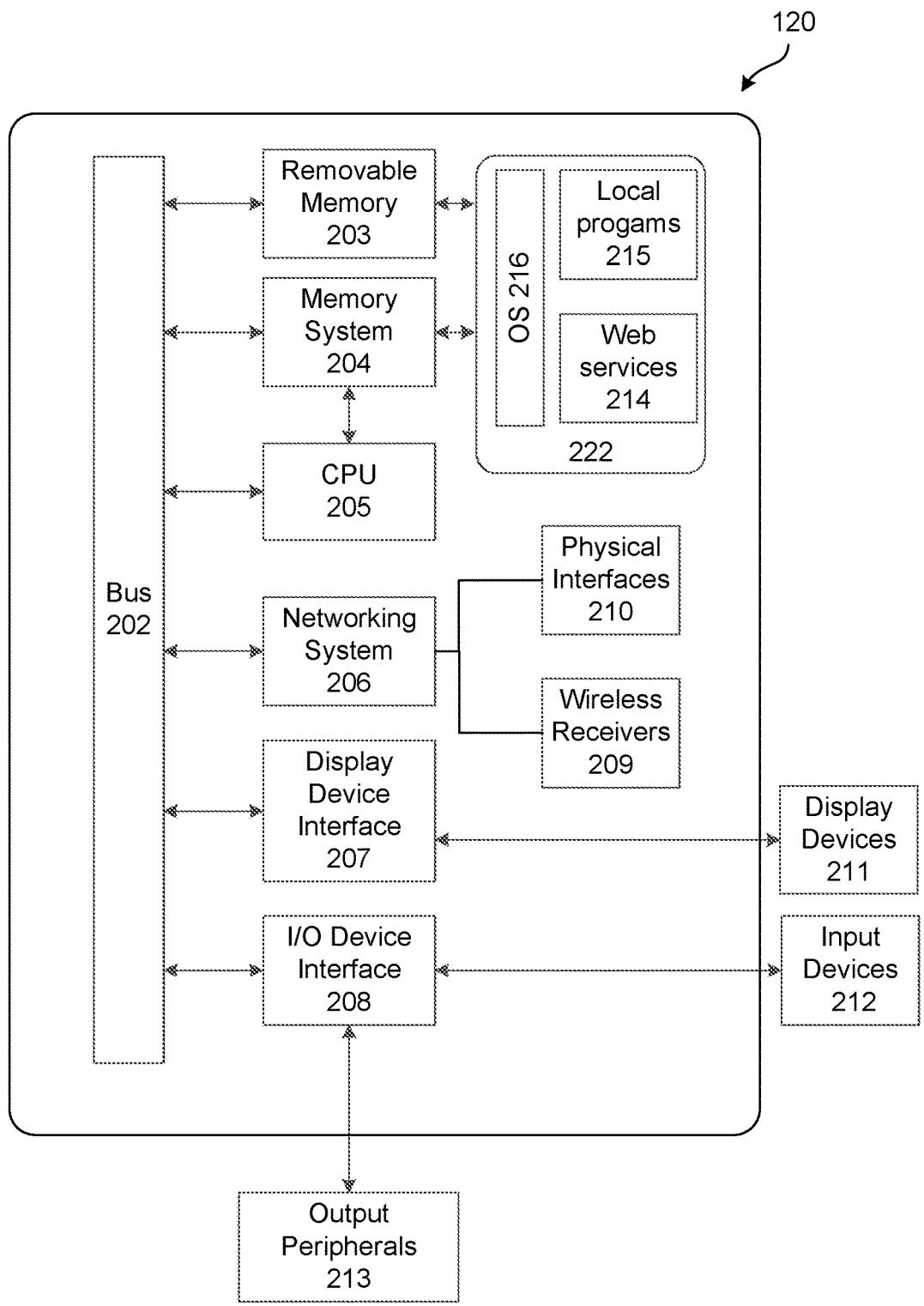
FIG. 2 is a block diagram of an exemplary user device implemented as a mobile computing device according to one embodiment.

FIG. 2 illustrates a block diagram, according to an embodiment, of an exemplary user device 120 implemented as a mobile computing device, and comprising a central system bus 202, a removable memory 203, a memory system 204, a central processing unit (CPU) 205, a networking system 206, display interfaces 207, and I/O device interfaces 208. The processing unit 205 may be any microprocessor which performs the execution of sequences of machine instructions, and may have architectures consisting of a single or multiple processing cores such as, for example, a system having a 32- or 64-bit Advanced RISC Machine (ARM) architecture (e.g., ARMvx). The processor 205 issues control signals to other device components via the system bus 202, and has direct access to at least some form of the memory system 204.

The memory system 204 provides internal media for the electrical storage of the machine instructions required to execute the user application. The memory system 204 may include random access memory (RAM), non-volatile memory (such as ROM or EPROM), cache memory and registers for fast access by the processing unit 205, and high volume storage subsystems such as hard disk drives (HDDs), or solid state drives (SSDs). Individual memory system components, such as the high volume storage subsystems, may include separate interfaces and/or buses to the main system bus in order to increase data transfer efficiency. A removable memory system 203 may be implemented in the form of flash drives or removable high volume storage devices, connectable to the device 120 via a data port implementing a particular data transfer protocol, such as for example Universal Serial Bus (USB).

A portion of the non-volatile memory within the memory system 204 may contain a Basic Input/Output System (BIOS) which includes routines facilitating the communication of data and control signals between components of device 120. The processes executed by the system 120 are implemented as programming instructions of one or more software modules 222 stored on non-volatile storage of the memory system 204 and/or removable memory 203. In alternative embodiments, the processes, or parts of the processes, may be executed by one or more standard computer systems, such as an Intel Architecture computer system configured as a desktop or laptop workstation. In some other embodiments, the processes may be executed by one or more dedicated hardware components, such as field programmable gate arrays (FPGAs) and/or application-specific integrated circuits (ASICs).

The modules stored include an operating system 216, one or more local application programs 215, and one or more web services modules 214 providing Internet or networked data access functionality. These services modules 214 may include web server software 426 (e.g., Apache), scripting language modules (e.g., PHP, or Microsoft ASP), and structured query language (SQL) support modules (e.g., MySQL) enabling data to be stored in, and retrieved from, a data store (such as an SQL database) in communication with the device 120.

As described herein, the one or more local application programs includes the DSDMA 300. Program data stored within the modules 222 may include data instructions and results produced or used by the application 300. More generally application programs 215 may include methods, data structures or other software services that define data or perform functions as required by the device 120. The data and instructions of an application program 215, and the operating system 216, may reside in multiple parts of the memory system 204, including the registers, cache, main memory, and high volume storage, or in the removable memory 203.

The system bus 202 provides functionality enabling the exchange of data between the components of the device 120. The system bus enables the processing unit 205 to issue control signals to other components, including memory system 204, for the purpose of transferring data. The system bus 202 may be of varying structure, and may possess one or more sub-buses such as a memory bus interconnecting the memory system 204 components and/or or a peripheral bus such as AGP or PCI.

The I/O device interface 208 provides functionality enabling the user to interact with the device 120 via one or more I/O devices such as a mouse and keyboard. Other external user input devices 212 which may be connected include a microphone, an IR remote control, camera, and gesture systems. The device 120 includes one or more onboard input devices such as a touchpad or touch screen enabling a user to interact with the device 120. The I/O device interface 208 also provides functionality for the device 120 to instruct output peripherals 213, which may include printers, audio devices, and imaging devices.

The display device interface 207 may include one or more dedicated graphics interfaces, which transmit graphics and video signals between the device 120 and display devices 211. The display devices 211 may consist of inbuilt displays, including for example a display panel. In the described embodiments, display devices 211 are at least configured to display one or more input passcodes generated by the device 120 visually to the user 101, as instructed by the DSDMA 300.

The device 120 is connectable to a networking system 206 through a wireless or wired transmission media enabling the logical connection of the computing device 120 to other networked computing devices. Connections to networks or other computing devices are formed via communication subsystems such as wireless transceivers 209 and/or physical interfaces 210. The computer system 120 may exchange information with the connected networks. For example, the IEEE 802.xx family of protocols may be used for exchanging information wirelessly with a computer or any other device or location associated with a wireless identity. This includes devices connected over technologies such as WiFi, WiMax and Bluetooth, and in the form of either structured or ad-hoc communications.

The skilled person in the art will appreciate that many other embodiments may exist including variations in the hardware configuration of device 120, and the distribution of program data and instructions to execute the DSDMA 300.

Figure 3:
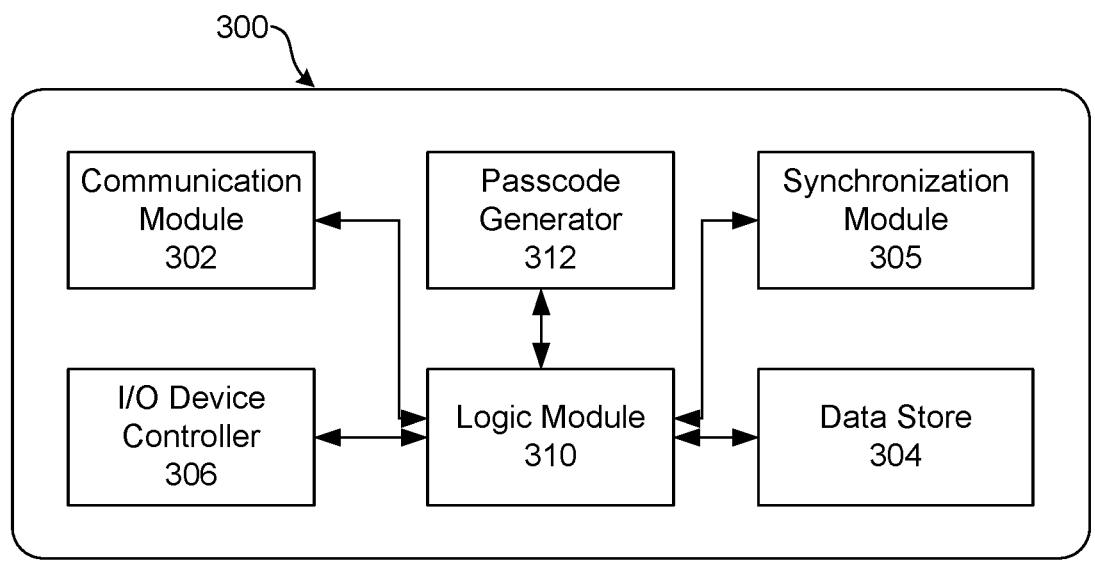
FIG. 3 is a block diagram of an exemplary configuration of a data storage device management application (DSDMA) according to one embodiment.

FIG. 3 illustrates a block diagram representation of an exemplary configuration of the DSDMA 300, according to an embodiment, which comprises a logic module 310 coupled to one or more other application modules, including: a communication module 302; a data store 304; an I/O device controller 306; a synchronization module 305 and a passcode generator 312. Communication module 302 enables the exchange of data between the DSD 100 and one or more other devices. Communications module 302 is configured to connect DSD 100 to the one or more other devices via a communications network which may be a local area network (LAN) or a wide area network (WAN), such as the Internet.

Communications module 302 may implement one or more protocols for inter-device communication, such as for example Transmission Control Protocol (TCP) or Internet Protocol (IP) for the exchange of data over the Internet. The communications module 302 also provides functionality to enable direct communication between the DSDMA 300 and the one or more other devices (such as the DSD 100). For example, direct communication may occur wirelessly via Bluetooth, WiFi, or Near Field Communication (NFC) in order to synchronize the secret passcode generation key and the reference time value between the DSD 100 and the user device 120 executing the DSDMA 300. In other embodiments, the communications module 302 may support an exchange of data between the DSD 100 and the user device 120 over a physical connection, such as for example a USB connection between the I/O device interface 208 of the device 120 and the data port 106 of the DSD 100.

I/O device controller 306 generates signals and control data to enable the DSDMA 300 to receive input data from I/O components of the user device 120. This may include operation of device image and/or video capture components, such as camera devices, and audio capture components such as microphones or arrays of microphones of user device 120. I/O device controller 306 generates I/O data from image and/or audio based input and transfers this data to the logic module 310. I/O device controller 306 also provides functionality for the control of physical device I/O components, such as a display screen, for presenting generated input passcodes produced by the passcode generator 312 to the user of the DSDMA 300.

Data store 304 controls the storage of application and device specific data by the DSDMA 300. That data stored in data store 304 includes: parameters and configuration data enabling the execution of the DSDMA 300 on user device 120; user information relating to the use of DSDMA 300 to user 101; and DSD data specific to the DSD 100 being managed by DSDMA 300.

As described herein, the data store 304 is implemented as a series of data tables forming a relational database accessible via a database management system (DBMS) submodule of the store 304. A user table is defined to store the user information including, in relation to user 101: a user ID key (UID) uniquely identifying the user 101 among all users of the DSDMA 300; a user account identifier (UAC) of an application account of user 101 for operation of the DSDMA 300; and personal details of the user 101 including a name, address, and phone number. The account identifier maps to a corresponding entry in a user account table containing information for the user 101 to authenticate themselves with the DSDMA 300, such as for example, user password data and recovery information (e.g., a secret question and answer combination). The data store 304 may store particular data in a secure form, such as for example by applying a cryptographic primitive (e.g., the SHA-1 hash function) to the values prior to their entry into the database.

Storage device data maintained by the data store 304 includes a device identifier key (IDK) uniquely identifying the DSD 100. IDK may be a globally unique value which distinguishes the device from all others such as a registration key or serial number of the device. In other embodiments, IDK may locally distinguish the DSD 100 from all other devices managed by the DSDMA 300 executing on the user device 120. For example, DSDMA 300 may produce an IDK for DSD 100 based on a name or label of the device, as specified arbitrarily by user 101. By recording the IDK of DSD 100, the application 300 associates the DSD 100 with the account of user 101, enabling the user 101 to generate input passcodes for DSD 100 following the authentication of the user 101 with the DSDMA 300. In this sense, the methods described herein for accessing user content on DSD 100 involve two levels of authentication, since the user 101 first authenticates their user account with the management application 300 (for which the DSD 100 is registered), and then enters the input passcode determined from the application 300 (as described below) into the DSD 100. In some examples, the data store 304 a predetermined passcode of the device 100 that is combined with the generated unlock passcodes to determine whether a user 101 is provided with access to the user content data 109. The predetermined passcode may be a user-selectable code, such as a PIN value that is selectively set by the user 101 at a configuration stage of the device 100. Alternatively, the predetermined code may be a single fixed code that is determined at the time of manufacturing.

Data store 304 is also configured to store passcode generation data used to generate input passcodes in accordance with the synchronous TOTP generation processes described herein, including: the secret passcode generation key; and a reference time value. The passcode generation data is stored in an authentication table, where entries are indexed by the combination of the unique device IDK and the UAC value. Passcode generation data may be stored in a separate synchronization module 305 in some embodiments. The synchronization module 305 provides a dedicated memory space for storing the authentication data elements such that the synchronization processes described herein are conducted more effectively. For example, synchronization module 305 may be implemented as a block of contiguous addresses in a different physical storage media compared to other data in data store 304 (e.g., cache vs RAM addressing). Consequently, the operations to access, modify and store the authentication data can be performed more efficiently by the logic module 310.

Passcode generator 312 produces the input passcode in response to a generate code request by user 101. Passcode generator 312 is invoked by logic module 310 to produce TOTPs synchronized with the corresponding generation process of processor 111 of DSD 100. As described herein, the DSDMA 300 generates input passcodes based on the secret passcode generation key and the reference time value, such as a time stamp, maintained in association with the DSD 100. Logic module 310 is configured to provide the generation key and the reference time value to passcode generator 312 after retrieving the data from the data store 304 and/or the synchronization buffer 305. The passcode generator 312 produces a generated input passcode for each invocation by the logic module 310 at a specific instant in real-time. That is, the passcode generator 312 includes a clocking process configured to generate and process time-stamp data in order to produce the time-changing code values.

In the disclosure herein, the DSDMA 300 is a proprietary software application of the vendor of DSD 100. As such, the software modules and components described herein above may be implemented differently depending on the hardware requirements and specifications of the user device 120. In other embodiments, where the DSDMA 300 is a generic software application the modules of application 300 may be implemented as interfaces or links to other third party application modules.

In embodiments where the input passcodes are not generated locally, the passcode generator 312 may include an application program interface (API) through which the passcode is retrieved. For example, input passcode may be obtained via a query to a remote server (e.g., as managed by the vendor of DSD 100), configured to provide the passcode, following verification of some other data maintained by the DSDMA 300 (e.g., the user authentication data and the IDK value). In this case, although the user 101 determines the input passcode from the user device 120 (via DSDMA 300), the synchronous generation of the actual passcode values is performed by a remote device (i.e., such that the user device 120 acts as a gateway or intermediary for retrieving the code values).

Figure 4:
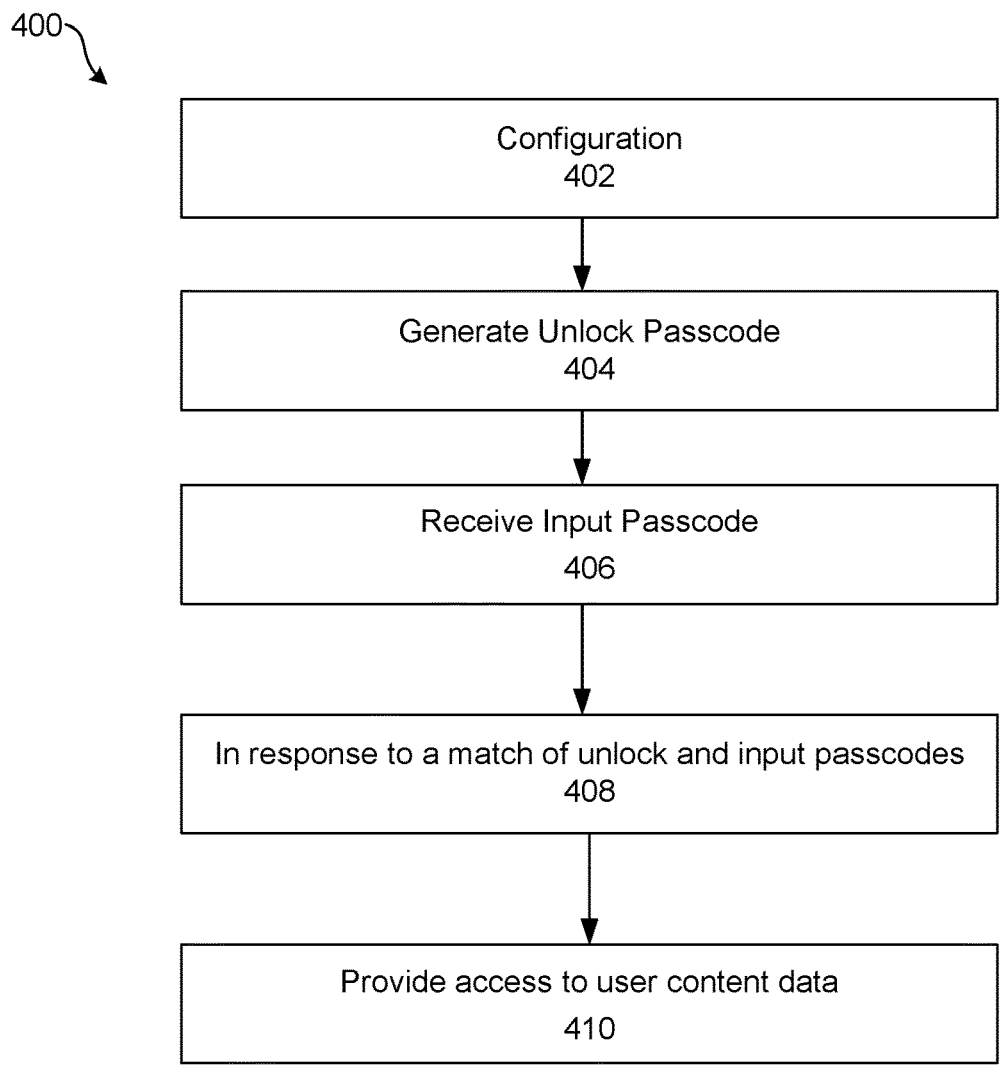
FIG. 4 is a flow diagram of a process for accessing data of the data storage device according to one embodiment.

FIG. 4 illustrates a flow diagram of a process 400 for accessing data of the DSD 100. As a preliminary step 402, the DSD 100 performs an initialization or configuration sub-process to configure the device components, including the access controller 110, cryptography engine 107 and data port 106, such as for example by loading firmware instructions and data from a non-volatile memory. A start-up sequence of the device 100 initializes the access controller 110 (e.g., as may occur in response to battery 113 being first connected). During initialization, the processor 111 sets the values of one or more parameters used in the TOTP unlock code generation process, including the passcode generation key which may be obtained from the device firmware. A clocking signal from the clock 112 is used to generate a real-time non-decreasing counter value that is used to produce the time-varying codes in conjunction with the reference time value. The processor 111 loads the passcode generation key and the reference time values into the system memory 114 for use in an unlock passcode generation routine, as described below.

The secret key of the DSD 100 can be stored in the device at the time of manufacture. Alternatively, a unique product key can be initially stored and subsequent keys can be derived from that product key (e.g., by operations of the access controller 110). In some embodiments, the device 100 may be provided with a key pair at manufacturing that is used to algorithmically generate a corresponding decryption key. One or more seed values for key generation can be provided at manufacture time. This enables the generation of one of the key pairs with a known algorithm, or the values may be used in combination with the key pairs to generate the cryptographic key(s).

Time-Based One-Time Password Codes

Figure 5:
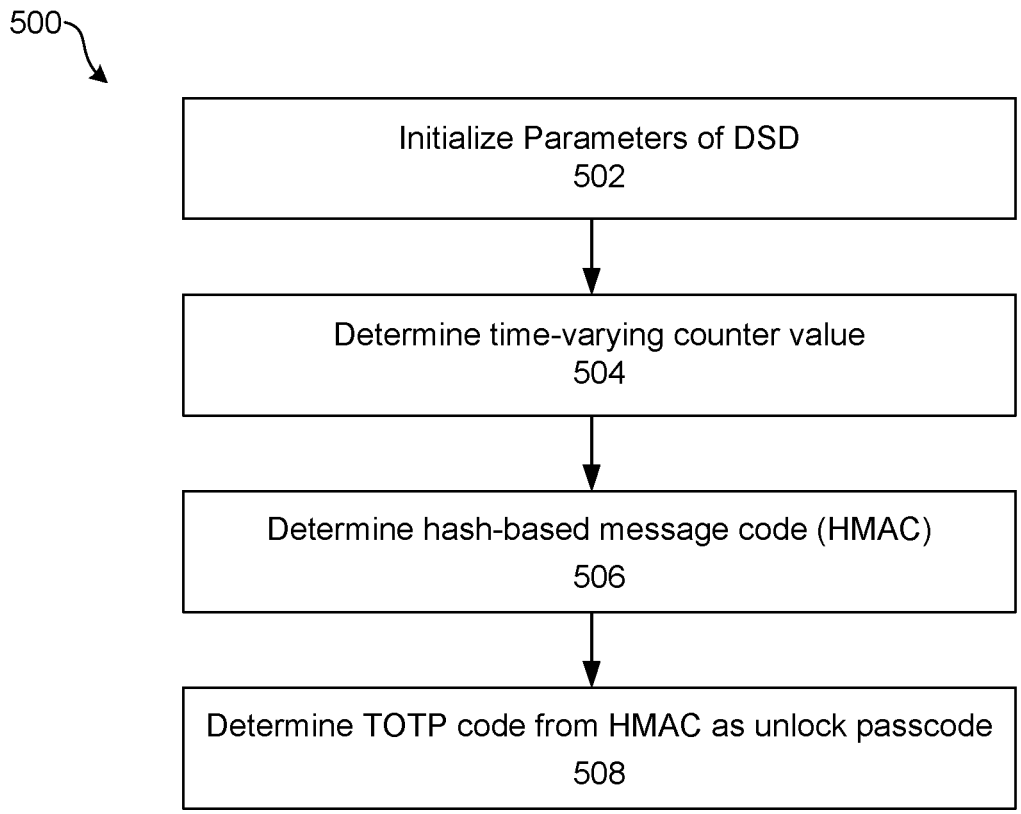
FIG. 5 is a flow diagram of the execution of an unlock passcode generation routine for accessing data of the data storage device according to one embodiment.

At step 404, the access controller 110 repeatedly and automatically generates the unlock passcode. FIG. 5 illustrates a flow diagram for the execution of the unlock passcode generation routine 500, by the access controller 110, as a Time-based One-time Password (TOTP) routine according to the IETF standard RFC 6238. Specifically, the TOTP passcodes produced by generation routine 500 produces are a form of hash-based message authentication code (HMAC), where the source of uniqueness is typically a value generated from the current time and a unique seed number.

At step 502, the access controller 110 initializes the routine 500 by establishing a set of TOTP parameters, including: a cryptographic primitive; a secret key K; a code length d; and one or more counter variables defining the computation of a counter value C. The cryptographic primitive is a hashing function H implemented as the SHA-1 algorithm in the present disclosure. Hashing operations are performed by the processor 111 on the secret key K, which is the passcode generation key of the DSD 100 (as described above). The code length d defines the number of digits in the generated passcode values, and is set to a prescribed fixed value for the DSD 100 as determined from the memory 114. Typically, the code length d is between 6 and 10.

For the devices 100 disclosed herein, the passcode generation key K is an arbitrary byte string, of a predetermined length. The key K is determined at the time of manufacture of the respective device 100 and is stored in dedicated area of the system memory 114 (e.g., in firmware). The key K acts as a "master key" value that is used to access the device since anyone who has access to the value K (or the corresponding label representation $L_K$ described below) can synchronize with (subject to using the correct time origin), and subsequently unlock, the device. It is therefore desirable for the key K to be unique to each DSD, as determined at the point of manufacture of the devices. Accordingly, in some embodiments the passcode generation key K is generated based on the IDK value of the device.

Counter C is a dynamic real-time based counter (denoted $C_T$) which has a value determined by the counter variables: T, a time differential calculated as the difference between the current time, as determined by clock 112, and the reference time value $T_{ref}$ in seconds; $T_0$, an offset value $T_0$ which is an offset in seconds to the epoch time of the DSD 100; and $T_x$, the duration of an interval which will be used to calculate the value of the counter $C_T$. The counter variables T, $T_x$ and $T_0$ are represented as positive integers within the access controller 110.

Unlike the counter variable, the reference time value $T_{ref}$ is a timestamp initialized to the epoch value (timestamp) of the device 100. By default, the epoch is the Unix epoch of 00:00:00 UTC on 1 Jan. 1970. As default values, the access controller 110 sets the code length to 6, the interval length $T_x$ to 30 seconds, and the offset value $T_0$ to zero. That is, each unlock passcode generated by the access controller 110 will be valid for $T_x$=30 seconds defining a limited time window for which a synchronously generated input passcode will be valid to access the device (i.e., before the input code would need to be regenerated).

The TOTP parameters may vary according to the desired characteristics of device 100, with the parameters values being determined by the firmware of access controller 110. Access controller 110 may be configured to optimize the automatic and repeated generation of the TOTP codes by loading the secret key K (i.e. the passcode generation key) and the reference time value $T_{ref}$ into the synchronization buffer 115.

Following initialization, the access controller 110 generates unlock passcodes by the repeated execution of steps 504-508. First, at step 504, the time-varying counter value $C_T$ is determined as a non-decreasing value based on the current time differential value T. The processor 111 updates the value of T based on signals received from clock 112, such that T represents the amount of time passed, in seconds, since the reference value $T_{ref}$. Processor 111 then applies the offset value $T_0$ to calculate the offset time differential as $\delta = T - T_0$. The time-varying counter value is generated by a floor function as:

$$C_T = \left\lfloor \frac{\delta}{T_X} \right\rfloor = \left\lfloor \frac{T - T_0}{T_X} \right\rfloor.$$

At step 506, the access controller 110 determines a HMAC value from hashing key K with the dynamic counter value $C_T$. The HMAC output produced by hashing function H is denoted as $HMAC_H(K, C_T)$, which is a 160 bit (20 byte) digest value when SHA-1 is used as disclosed. In order to produce a passcode of length d, a HOTP value is generated from the HMAC output as a human-readable d-digit decimal number (without omission of leading 0s). The HOTP value is firstly obtained by truncation of the HMAC output $HMAC_H(K, C_T)$:

$HOTP(K, C_T) = truncate(HMAC_H(K, C_T))$, where the truncation is performed as a two-step process involving: i) taking the 4 least significant bits of the MAC and uses them as a byte offset, i as truncate(MAC)=extract31(MAC,MAC[(19×8)+4: (19×8)+7]×8)

and ii) using index i to select (or "extract") 31 bits from MAC, starting at bit i*8+1 as extract31(MAC,i)=MAC[i×8+1:i×8+(4×8)−1].

The extracted 31 bits forms the HOTP value. The processor 111 can place the HOTP value in a 4-byte word without using the sign bit (the most significant bit), and thereby avoids doing modular arithmetic on negative numbers. As a final step 508, the TOTP passcode value is obtained by truncating HOTP value to d-digits as: TOTP $(K) = HOTP(K, C_T) \bmod 10^d$.

The access controller 110 is programmed to execute steps 504-508 of the unlock passcode generation routine 500 repeatedly over time resulting in a time-changing unlock passcode value for the DSD 100. In this disclosure, the processor 111 is configured to invoke the TOTP routine 500 periodically every $T_s$ seconds. Selection of an appropriate $T_s$ (i.e., $T_s > T_x$) ensures that the newly generated unlock passcode is distinct from the existing unlock passcode of the DSD 100. Typically, $T_s$ is set to a value between 10 and 300 seconds.

Figure 6:
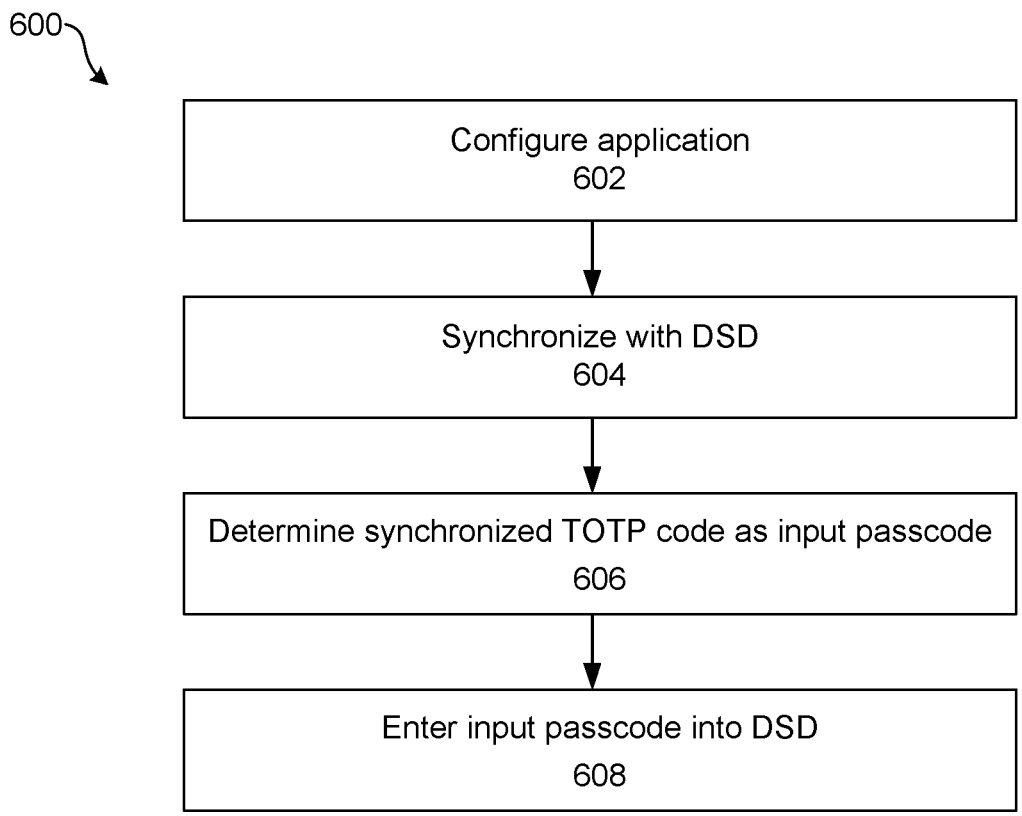
FIG. 6 is a flow diagram of an input passcode generation routine performed by the DSDMA and invoked by a user of the data storage device according to one embodiment.

The DSD 100 receives a passcode from user 101 (either by manual input via the input components 102, or electronically), including at least the input passcode provided by user device 120. In this embodiment, as shown in step 406, the received passcode is the input passcode generated synchronously by the DSDMA 300 of the user device 120 with the generation of the unlock passcode by the access controller 110 of the DSD 100. FIG. 6 illustrates a flow diagram for an input passcode generation routine 600 performed by the DSDMA 300 and invoked by user 101. At step 602, the user 101 configures the application 300 to manage the DSD 100, thereby enabling the generation of input passcode values for the device 100.

Use of the DSDMA 300 by user 101 is subject to a preliminary authentication process to verify that the user 101 is authorized to operate the application 300. The user 101 authenticates with the DSDMA 300 by performing a login operation with the corresponding application user account. For example, in the described embodiments user 101 supplies application authentication information including: the user account name; and the user password, via input components of the user 120 device (e.g., the touchscreen for a mobile device). The logic module 310 receives the application authentication data from the I/O device controller 306, and performs a lookup operation to retrieve corresponding stored authentication data from the data store 304.

On successful verification of the provided authentication information, user 101 is presented with the drive management functionality of the DSDMA 300. Management of the DSD 100 involves registering the device in association with user 101 via the with the application 300. If device 100 has not previously been registered with user 101, the user selects an 'Add Drive' function from the application UI and enters registration information for the DSD 100. As described herein, the registration information includes a unique device identifier key (IDK) of the DSD 100, and a name or label for the device. User 101 may obtain the IDK value from materials supplied with the device and/or affixed to the housing of the device (e.g., on a sticker or within an information booklet provided on purchase). In other examples, the DSDMA has access to the device's camera to capture a photo of a Quick Response (QR) code. The QR code encodes the IDK value which then becomes available to the DSDMA 300 by decoding the QR code.

As part of the registration process, the user 101 may obtain the predetermined passcode of the device 100, in implementations where such a code is required for the provision of access to the stored data. The user 101 may obtain the predetermined code from materials supplied with the device, as described above. In some embodiments, the user 101 may selectively set the predetermined code to a new value by the selection of a 'Change Drive Code' function from the UI of application 300. The user 101 may then enter a new predetermined code into the device 100 via input components 102. The predetermined passcode is a static code maintained by the device until the code is again selectively set by the user 101.

Synchronization

Configuration of the DSDMA 300 to manage the DSD 100 includes a synchronization step 604 that enables the synchronous generation of the input passcode by the user device 120 with the automatic and repeated generation of the unlock passcode by the data storage device 100. In the described embodiments, synchronization 604 involves two sub-steps including: i) key sharing; and ii) time reference synchronization.

Key sharing involves the DSD 100 sharing the secret passcode generation key K with the application 300 of the user device 120. Key sharing may be achieved by representing the passcode generation key K as a machine-readable optical label (i.e., either as an encoded representation, such as a barcode, or a plaintext representation), denoted $L_K$. Label $L_K$ may be provided in a variety of different forms depending on the characteristics of the device 100, and the extent to which it is desired to segregate the representation of the key K from the device. For example, the label may be represented on a physical media, such as a reference card or sheet, for provision with the data storage device 100 and as physically separated from the device 100 (e.g., where the card is included within the box or packaging of the device at the time of manufacture). Alternatively, or in addition, the DSD 100 can be configured to display the label $L_K$ on display 103 of the device 100. In this case, label $L_K$ is maintained by the access controller 110 as key display data within system memory 114, where the key display data is retrieved by the processor 111 and rendered on display 103 during key synchronization.

In the disclosed embodiments the label representation $L_K$ of key K is a Quick Response (QR) code, produced according to the ISO/IEC 18004:2015 standard. Encoding is performed using version 10 in binary mode, where 8 bits are used to encode each character in accordance with ISO 8859-1. In the described embodiments, the code error correction level is set to high ('H') enabling restoration of approximately 30% of the encoded key value via Reed-Solomon error correction. This supports the encoding of up to 174 characters representing the key, as rendered in a 57×57 module. Different encoding techniques may be used for the generation of the QR code label $L_K$. Specifically, the version and mode of the encoding scheme can be configured based on the amount of data required to encapsulate the passcode generation key K. For example, version 40 binary encoding permits a larger number (i.e. 1264) of ASCII text characters to be encoded, which may be beneficial in cases where the representation is large in size (such as, for example, if long key lengths are used).

To obtain the passcode generation key K of the DSD 100 from the label representation $L_K$, the DSDMA 300 performs an optical scanning operation. The scanning operation may be initiated by the user 101 selecting a 'Scan Key', or similar, function as part of a synchronization routine to synchronize DSD 100 to the device 120. Where the user device 120 is a mobile phone device, logic module 310 instructs the imaging components 212 (e.g., the phone camera) to capture image data corresponding to an image of the label $L_K$. The QR code captured by the image data is processed to determine the passcode generation key K, which is transferred to an authentication table of data store 304, and/or to synchronization module 305, by the logic module 310.

In some embodiments, key sharing involves transmission of the passcode generation key K over a wireless communication channel. This may involve, for example, the use of an NFC tag within the DSD 100 configured to be read by the user device 120. In such a configuration, the DSD 100 performs wireless transmission of the passcode key K (i.e., by activation of an NFC tag) in response to a wireless key transmission request made by user 101 via input components 102. For example, the user 101 may make a wireless key transmission request by pressing a 'Wireless Key Sharing' button on a keypad or display of the device 100. The access controller 110 processes the request and activates the internal NFC tag to initiate transmission of the passcode generation key according to a wireless communication protocol.

In other embodiments, transmission of the passcode key K to the user device 120 may be performed in other ways, including: automatic transmission of the key from the device 100 following power up; automatic transmission of the key by an always-on beacon (e.g., via a Bluetooth low energy device); reactive transmission of the key in response to a key-press; automatic transmission of the key via NFC; automatic transmission of the key in response to a request transmitted from the application 300, where the device 100 receives the request in an "always listening" mode; transmission of the key via the data port 106 when connected to an external device.

The user 101 directs the user device 120 to receive the wireless broadcast signal by selecting a 'Obtain Key Wirelessly' button, or similar element, on the UI of the DSDMA 300. In response to the user device 120 entering NFC transmission range of the DSD 100, the wireless receiver 209 detects the broadcast signal and the communications module 302 transmits the received message data to the logic module 310 for extraction of the passcode generation key K. The logic module 310 transfers received key K to an authentication table of data store 304, and/or to synchronization module 305.

In an alternative configuration, transmission of the passcode generation key K occurs via the establishment of a Bluetooth connection between the DSD 100 and the user device 120. In this case, the 'Wireless Key Sharing' and 'Obtain Key Wirelessly' buttons on the DSD 100 and user device 120 respectively are configured to initiate a Bluetooth pairing operation between the devices. Following a successful Bluetooth connection between the data storage 100 and user 120 devices, the passcode generation key K is transmitted from the access controller 110 to the logic module 310 over the wireless channel. In embodiments using either NFC or Bluetooth communication, the logic module 310 may be configured to direct the communication module 302 to send an acknowledgement message to the device 100 confirming the receipt of the key K (and thus indicating the completion of the wireless transmission of the passcode key between the devices 100 and 120).

In order to prevent the permanent exposure of the key K, transmission of the passcode generation key K by the device 100, in response to a wireless key transmission request, is a time limited operation (i.e., the broadcast signal is terminated after a short time period, such as 10 seconds). This results in a need for the user 101 to coordinate a wireless key transmission request made to the device 100 with a corresponding activation of the receive key function on application 300 thereby protecting against interception of the signal by an unauthorized party (i.e., where the unauthorized party does not have knowledge of when the short broadcast window will occur). Further, in some embodiments wireless key transmission requests are enabled only if the device 100 is not yet registered with any user account of the DSDMA 300 (i.e., if no previous wireless key transmission operation has been successfully completed). In this case, following a successful wireless key transmission operation the retransmission of the key requires the input of a special admin code into the device (e.g., via the keypad, or similar input component such as a touchscreen display).

The second sub-step in the synchronization process 604 of FIG. 6 is a time synchronization operation. The objective of the time synchronization is to align the reference time value of the access controller 110, as used to produce unlock passcodes, to that used by the DSDMA 300 to generate corresponding input passcodes for device 100. That is, synchronization between the real-time counter values of the TOTP routines invoked by the user device 120 and the DSD 100 is performed so the sequence of codes produced by the respective routines are synchronized over time.

The user 101 issues a time synchronization request to the DSD 100 to commence the synchronization process. The time synchronization request may be issued by a physical interaction of the user 101 with one or more input components 102. For example, user 101 may activate a 'Sync now' button, or similar, of the components 102 to cause the generation of the time synchronization request.

In some examples, synchronization involves setting the reference time value of the access controller 110 to a current time value of the user device 120. The user device 120 transmits the current time of the device 120 to the DSD 100 within a synchronization message. The synchronization message may have a predetermined form such that the access controller 110 is configured to receive the message either via wireless communication (e.g., through the wireless modem) or wired communication (e.g., in the case that the user device 102 is physically connected to the DSD 100).

For example, the user 101 may place the user device 120 into a synchronization transmission mode by activating the sync element (e.g., the "Sync Drive" button) of application 300. The access controller 110 generates the synchronization message including the current time of the device 120, and transmits this to the DSD 100. In response to receiving the synchronization message, the processor 111 extracts the current time value and updates the reference time of the DSD 100. Access controller 110 maintains the time going forward via timing signals of generated by the clock 112. Synchronization based on the time sharing process described above is advantageous in that the user 101 does not need knowledge of the time values, and does not need to perform any further action following the activation of the synchronization transmission mode.

In some examples, synchronization involves setting the reference time values of the access controller 110 and the user device 120 to the same time value. In response to the time synchronization request, the access controller 110 sets the time reference value $T_{ref}$ of the synchronization data to a predetermined reset value, such as the default time epoch value. The DSDMA 300 performs a corresponding reset operation to reset the local reference time value stored in the authentication table in association with the DSD 100. This may be achieved by the user 101 activating a corresponding sync element (e.g., a "Sync Drive" button) of the UI of application 300 as rendered on the screen of the device 120.

The time resetting process relies on the user device 102 and the DSD 100 using the same predetermined reset value, which may not always be true. In other examples, aligning the respective time reference values of the access controller 110 and the user device 120 involves: setting the reference time value of the access controller 110 to a real-time dynamically determined time value; and generating a time indication signal that automatically causes the user device 120 to set its reference time to the same dynamically determined time value. In such embodiments, the subsequent steps of the synchronization process vary depending on whether the process is:

1) a time capturing process, involving setting the reference time value of both the device 120 and the DSD 100 to a real-time dynamically determined time value; or
2) a time entry process, involving setting the reference time value of both the device 120 and the DSD 100 to an arbitrary user-defined value.

In the case of the time capturing process (2), in response to the time synchronization request, the access controller 110 is configured to selectively set its reference time value $T_{ref}$ to a "captured" time value that is dynamically determined in real-time. The access controller 110 then generates a time indication signal that automatically causes the user device 120 to selectively set the reference time value associated with the data storage device 100 to the same dynamically determined time value.

For example, the user 101 may place the user device 120 into a synchronization detection mode by activating the sync element (e.g., the "Sync Drive" button) of application 300. In the detection mode, the DSDMA 300 directs the user device 120 to accept auditory and/or visual input through the input devices 212 and processed by I/O device controller 306. Then, the user 101 activates the 'Sync now' button, or similar, of the components 102 causing the access controller 110 to both: i) set its $T_{ref}$ value to a timestamp of the current real-time value (as determined by the clock 112); and ii) generate an audio and/or visual indicator that is detectable by the user device 120. For example, the indicator signal may be generated by changing an on/off status of an optical or acoustic emitter, such as to produce a sustained tone, a beep, or a combination, or to illuminate an LED.

On detecting the audio and/or visual signal, the logic module 312 immediately updates the reference time value of DSD 100 stored in data store 304 with the current time. This automatic alignment of the respective reference time values is effective to ensure that the counter values $C_T$ produced by TOTP routines of each device are synchronized even if the time formats of the devices differ (i.e., since the time differential value T is computed locally in each device relative to the local time format in that device).

The time capturing process relies on the user device 120 detecting the time indication signal immediately following the generation of the signal by the DSD 100. Ideally, this is achieved in response to the user 101 activating the input components 102 of the device 100 (i.e., the "Sync reset" button) at the same time as the corresponding UI element (i.e., the "Sync Drive" button) of the DSDMA 300 executing on device 120. However, this may not always occur, and a difference in the real-time actuation of either device may cause inadequate synchronization (e.g., if some time passes between pressing the activation buttons on the respective devices).

In the case of the time entry process (3): the DSD 100 includes a keypad (i.e., as part of the input components 102), and the access controller 110 is configured to receive input time data representing an input time entered into the keypad by the user 101. The input time is generated by the user device 120 in response to the user 101 activating an "Obtain Sync Time" function of the DSDMA 300 (e.g., by the use of a UI element such as a button). The DSDMA 300 displays the input time to user 101 via a display of the user device 120 in conjunction with instructions for the entry of the input time into the DSD 100.

For example, after activating the 'Sync now' button, or similar, of the components 102, the user may be instructed to enter the input time of 17:03:04 into the DSD 100 by pressing the digit buttons '0'-'9' on the keypad, followed by the "Enter" key. The input components 102, including the keypad, generate the input time data from the entry of the time value. Processor 111 receives the input time data from components 102 and, in response, sets the reference time $T_{ref}$ of the access controller 110 to the input time. The access controller 110 may direct the DSD 100 to provide the user 101 of confirmation of the time entry, such as via a message rendered on the display 103.

The time synchronization operations described above enable the establishment of a common time reference value between the DSD 100 and the DSDMA 300 which manages the device 100 for the purpose of generating synchronous passcodes. That is, the DSDMA 300 has prior knowledge of the other data values that are required for the DSDMA 300 to execute a TOTP routine, such as routine 500. This includes counter variables $T_x$ and $T_0$ defining the time interval of validity for each generated TOTP and the differential offset value.

In some embodiments, the access controller 110 can be configured to perform time synchronization by sending a synchronization message to the user device 120 by wireless communication. For example, a wireless communication channel may be established between the DSD 100 and the user device 120 via a protocol such as Bluetooth or NFC, as described above. In other embodiments, the synchronization message is sent to the user device 120 via wired communication, such as a USB connection. A unidirectional data transfer from the DSD 100 to the user device 120 is performed to synchronize the reference time values of the respective devices. In response to a time synchronization request (e.g., initiated from a button press, as described above), access controller 110 generates a synchronization message to encapsulate the synchronization data presently maintained by the DSD 100 in the system memory 114 and/or synchronization buffer 115.

In one example, the unidirectional data transfer is achieved by way of a light emitting diode (LED) or other light source on the DSD 100 which is switched on and off to transfer data. In one form, the user device 120 comprises a camera, which is activated by the DSDMA 300. The user points the camera onto the LED so that the DSDMA 300 can detect the on and off status of the LED. In one form, the camera detects an on status and waits for the off status. As soon as the LED is turned off, which is detected by the camera, DSDMA 300 starts the timer to repeatedly generate passcodes. The DSD 100 starts an identical timer also at the time when the LED turns off. As, a result, both timers and therefore the generation of the passcodes, are synchronized.

In other examples, the synchronization data includes the timing related parameter values used to generate the unlock passcode as a TOTP, such as: the time offset $T_0$ of the counter; the time interval $T_x$ of the counter; and the reference time value $T_{ref}$. The synchronization message is of a predetermined form that is recognized by the DSDMA 300. On receipt of the synchronization message by the user device 120, the communications module 302 extracts the synchronization data from the message and transmits the data to the logic module 310. The logic module 310 performs an update operation to set the values of the local parameters (e.g., those stored in data store 304 and/or synchronization buffer 305) with the values provided by the message data.

The configuration and synchronization steps of the disclosure authorize the user 101 to access the device 100, via the generation and provision of unlock passcodes, from an initial state in which the device 100 is unregistered. Following configuration and registration of the device 100 with user 101, authorization to access the device 100 may be provided to another user via user 101 invoking an "Authorize Other User" function of the DSDMA 300. This involves the DSDMA 300 of user 101: generating authorization data to encapsulate data from the authentication table of data store 304; and transmitting the authorization data to a nominated user device of the other user configured to execute an instance of the DSDMA.

The authorization data may include: an identifier of user 101; the IDK value of the device 100; a special key K; a synchronization data message enabling synchronization of the reference time value $T_{ref}$ for the device 100 and the other user's DSDMA; and any other parameter data required for the other user's DSDMA to compute unlock codes for the device 100. The synchronization data message can include a reference time relative to a common clock, and established via a distributed time synchronization protocol (e.g., the Network Time Protocol (NTP)). Alternatively, the other user may use the DSDMA via their own user account and repeat the configuration and synchronization steps of FIG. 6 disclosed herein.

In other embodiments, synchronization of the passcode generation processes is not time-based, where the TOTP values are instead refreshed in response to the receiving of code triggering data by the user device 120. For example, the DSDMA 300 may be configured to receive code triggering data from the DSD 100 as a message according to a predetermined form. The code triggering data may include a numeric parameter that is used in the TOTP calculation such that the DSD 100 and the user device 120 (or other device executing the DSDMA 300 as described herein) are synchronized in the case that there are a plurality of external devices configured to unlock the DSD 100. In response to receiving the code triggering data, the dynamic counter value C is incremented such that the TOTP value is refreshed. This provides an advantage in that time synchronization is not required to generate the dynamically changing unlock passcode values. However, as a trade-off, synchronization of the generated unlock and input passcodes relies on the ability of the user device 120 to receive the code triggering message.

Referring back to FIG. 6, at step 606 the user 101 selects a "Generate Passcode" option in the UI of the DSDMA 300 to cause the generation of an input passcode for selected device DSD 100. The logic module 310 retrieves data from the authentication table of data store 304, and/or synchronization module 305, and invokes the passcode generator 312. Passcode generator 312 initializes a local instance of the generation routine 500 and executes a single iteration of the routine to generate an input passcode. The generated input passcode is a time-changing code that is generated synchronously with the generation of the unlock passcode by the access controller 110 produced synchronously with the corresponding present unlock code of the DSD 100.

The passcode generator 312 transmits the generated input passcode to the logic module 310, which subsequently instructs the I/O device controller 306 to display the input passcode on a display device 211 of the user device 120 (e.g., the touchscreen of a mobile phone device). At step 608, the user 101 reads the input passcode from display 211 and enters the input passcode into the DSD 100 via the input components 102 (e.g., via keypad 105 and display 103). The input components 102 are configured to accept the entry of the input passcode as a series of interactions between the user 101 and the sub-components 105, 103 (i.e., the pressing of buttons on keypad 105), and to transmit the input passcode to the access controller 110.

In some embodiments, the DSD 100 is configured to receive the input passcode from an external device (e.g., user device 120 or host 130) over a wired or wireless communication channel. For example, a wireless communication channel may be established between the DSD 100 and the user device 120 via a protocol such as Bluetooth or NFC as described above. In some embodiments, the host 130 may be configured to execute the DSDMA 300 and to communicate with the DSD 100 via a wired channel (e.g., a data cable) connecting to the data port 106. The DSDMA 300 transmits an unlock request message over the channel which is received by the DSD 100 (e.g., via the wireless modem of input components 102). The unlock request message includes input passcode generated by the TOTP routine executed by the DSDMA 300. The request message data is transmitted to the access controller 110 for processing, either via the wireless modem or the data path 104. Therefore, in embodiments where time synchronization is also performed via the communication channel it is possible for a user 101 to synchronize with and unlock the drive using the external device, thereby bypassing the use of the keypad 103 entirely.

Returning to FIG. 4, at step 406 the access controller 110 receives the input passcode and processes the input passcode in conjunction with the present unlock passcode stored in the system memory 114 and/or buffer 115. The access controller 110 is configured to provide access to the user content data 109 in response to a match between the (first) received passcode entered into, or otherwise electronically provided to, the DSD 100 and the (second) passcode generated by the DSD 100, which are the input and unlock passcodes respectively in the described embodiments (i.e., as indicated in step 408). In some examples, a verification operation is performed by the access controller 110 to processes the unlock passcode and the input passcode. Processor 111 performs a comparison operation on the data representations of each code to check whether the input passcode matches with the unlock passcode. For example, processor 111 may be configured to perform a digit-wise comparison between the respective unlock and input codes, where the input passcode is determined to match the present unlock code if each digit is identical over the length of the codes.

In response to the input passcode matching with the unlock passcode, then at step 410 the access controller 110 provides access to the user content data 109 via the data port 106. This involves the access controller 110 enabling transmission of data through the data path 104 to the host computer 130, such as by electrically reconnecting the data port to the storage medium 108 and/or cryptography engine 107. The access controller 110 sets the data access state to the unlocked state to indicate the ability of a host computer system 130 to read and/or write user content data 109.

In other embodiments, the provision of access to the user content data 109 may involve a change in cryptographic state of the DSD 100 to a "unencrypted" state, such as to decrypt the user content data 109 to its plain form. In such embodiments, the cryptography engine 107 is directed to use a cryptographic key to decrypt the encrypted user content data 109 stored on the storage medium 108. The decryption operation may occur in response to a request from the host computer system 130 (i.e., requiring that the data access state is unlocked), and providing access to the user content data comprises the access controller 110 providing the cryptographic key to the cryptography engine 107.

In a special case of the embodiments discussed above, the physical data access state of the DSD 100 remains unlocked, and the access controller provides access to the user content data 109 via symmetric encryption and decryption operations performed with the unlock and input passcodes. An advantage of this embodiment is that the access controller 110 is not required to perform an active verification operation (e.g., a digit-wise comparison operation) to determine a positive match between the unlock and input passcodes.

An exemplary encryption mechanism is described in accordance with the special case outlined above. Let P be a private key of the DSD 100 for encrypting the user content data 109 by engine 107. Private key P is stored in the system memory 114 of the access controller 110, at least following an initial configuration of the DSD 100 (i.e., when the device is first powered on after manufacturing). Cryptography engine 107 is configured to use key P as a cryptographic key to encrypt one or more of: the user content data 109 stored on the storage medium 108; and data received from the data port 106 to be stored as user content data 109. The encryption operation is performed by an encryption function encrypt(m,X), which encrypts message in with encryption key X, with a corresponding symmetric decryption function decrypt(m,X). That is, for message data m the function call encrypt(m,X) produces encrypted output data M using cryptographic key X. A call to corresponding decryption function decrypt( ) using decryption key X', that is decrypt(M,X'), will output the original (plain) message data m only in the case that X=X' (i.e., the encryption and decryption keys match).

The above described symmetric encryption and decryption operations are implemented by the DSD 100 and used as a data access provision mechanism. Specifically, access controller 110 instructs the cryptography engine 107 to encrypt one or more of: the user content data 109 stored on the storage medium 108; and data received from the data port 106 to be stored as user content data 109, using the private key P as an encryption key. That is, original message data m of the user content data 109 is stored as an encrypted message M=encrypt(m,P). Access controller 110 repeatedly and automatically generates a dynamic unlock key E by encrypting the key P with the currently generated unlock passcode of the device 100 U, according to E=encrypt(P,U). As a result, the unlock key E dynamically changes based on the corresponding repeated and automatic generation of the unlock passcode U.

The access controller 110 generates a candidate key P' by decrypting the unlock key E with the received input passcode I, and instructs the engine 107 to decrypt the user content data stored 109 on the storage medium 108 using P'. That is, the candidate key P' is given by decrypt(E,I)=decrypt(encrypt(U,P),I), such that data m'=decrypt(M,P) is returned through the data port 106. As described above, the encrypt( ) and decrypt( ) functions are defined such that P'=P, and therefore m'=m, only in the case that the received input passcode I is identical to the unlock key E. Consequently, user 101 is provided access to the original user content data via the data port in response to the input passcode matching with the unlock passcode, but without any direct comparison between the passcodes. If the keys do not match, the DSD 100 returns corrupted data, which is essentially random as it has been determined using the wrong key. The symmetric encryption and decryption operations described above function analogously in embodiments where the received and generated passcodes of the DSD 100 are respective combinations of the dynamically changing input and unlock passcodes, with a static or predetermined passcode.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

The invention claimed is:

1. A data storage device comprising:
   a data path comprising:
   a data port configured to transmit data between a host computer system and the data storage device, wherein the data storage device is configured to register with the host computer system as a block data storage device; and
   a non-volatile storage medium configured to store user content data; and
   an access controller configured to:
   repeatedly and automatically generate a dynamically changing unlock passcode for unlocking the data storage device;
   set a reference time value of the access controller to a real-time dynamically determined time value;
   generate a time indication signal that automatically causes a user device external to the data storage device to set a corresponding reference time value of the user device to the same dynamically determined time value;
   receive a first passcode including at least, an input passcode provided by the user device, wherein the user device is configured to generate the input passcode:
   externally to the data storage device; and
   synchronously with the generation of the unlock passcode by the access controller using the corresponding time reference value; and
   provide access to the user content data via the data port in response to the first passcode matching with a second passcode generated by the access controller, wherein the second passcode includes at least the unlock passcode.

2. The data storage device of claim 1, wherein the second passcode further includes a predetermined passcode of the data storage device.

3. The data storage device of claim 2, wherein the predetermined passcode of the data storage device is selectively set by a user of the user device.

4. The data storage device of claim 1, wherein the input passcode is generated by the user device.

5. The data storage device of claim 4, wherein the access controller is further configured to generate the unlock passcode as a time-based one-time passcode based on a passcode generation key and the reference time value.

6. The data storage device of claim 5, wherein the access controller is further configured to share the passcode generation key by sending the passcode generation key over a wireless communication channel via a protocol such as near field communication (NFC) or Bluetooth.

7. The data storage device of claim 5, wherein the access controller is further configured to share the passcode generation key by displaying a quick response (QR) code encoding the passcode generation key on a display of the data storage device.

8. The data storage device of claim 1, wherein the access controller is further configured to perform, responsive to a predefined time period value having expired, a time synchronization operation to align the time reference value of the access controller with the corresponding time reference value of the user device associated with the data storage device.

9. The data storage device of claim 1, wherein:
   setting the time reference value of the access controller involves setting the reference time value of the access controller to a current time value of the user device; and
   the access controller is further configured to receive the current time value within a synchronization message transmitted to the data storage device.

10. The data storage device of claim 1, wherein setting the reference time value of the access controller to the real-time dynamically determined time value is based on a clocking signal from a clock of the access controller.

11. The data storage device of claim 1, wherein generating the time indication signal comprises changing an on/off status of an optical or acoustic emitter.

12. The data storage device of claim 8, wherein performing the time synchronization operation comprises a unidirectional data transfer from the data storage device to the user device.

13. The data storage device of claim 1, wherein the access controller is further configured to receive the input passcode from the user device or the host computer system.

14. The data storage device of claim 1, wherein:
   the access controller is further configured to selectively set a data access state of the data storage device to either:
   an unlocked state to enable transmission of the user content data between the host computer system and the non-volatile storage medium; or
   a locked state to disable transmission of the user content data between the host computer system and the non-volatile storage medium, and
   providing access to the user content data via the data port involves setting the data access state of the data storage device to the unlocked state.

15. The data storage device of claim 1, wherein:
   the data path further comprises a cryptography engine connected between the data port and the non-volatile storage medium and configured to use a decryption key to selectively decrypt encrypted user content data stored on the non-volatile storage medium; and
   the access controller is further configured to provide the decryption key to the cryptography engine.

16. The data storage device of claim 15, wherein:
   the cryptography engine is further configured to use an encryption key to selectively encrypt one or more of:

the user content data stored on the non-volatile storage medium; and
data received from the data port to be stored as user content data on the non-volatile storage medium; and
the access controller is further configured to provide the encryption key to the cryptography engine.

17. The data storage device of claim 16, wherein the encryption key and the decryption key are the same key.

18. The data storage device of claim 16, wherein:
the access controller is further configured to:
repeatedly and automatically generate an unlock key by encrypting the encryption key using a currently generated unlock passcode of the data storage device;
generate the decryption key by decrypting an unlock key of the data storage device using the received input passcode;
cause the decryption key to be used in a decryption function of the data storage device to apply the decryption function to, at least, a portion of the encrypted user content data; and
return a result of the decryption function to the host computer system via the data port; and
the encrypted user content data is encrypted by using the encryption key in a corresponding encryption function of the data storage device.

19. A method for accessing data on a data storage device, the method comprising:
repeatedly and automatically generating a dynamically changing unlock passcode for unlocking the data storage device;
receiving, in a synchronization message transmitted from a user device external to the data storage device, a current time value of the user device;
performing, based on the current time value, a time synchronization operation to align a time reference value of the data storage device with a corresponding time reference value of the user device;
receiving a first passcode including an input passcode provided by the user device, wherein the input passcode is generated externally to the data storage device and synchronously with the generation of the unlock passcode by the data storage device using the time reference value; and
providing access to user content data via a data port of the data storage device in response to the first passcode matching with a second passcode generated by the data storage device, wherein the second passcode includes at least the unlock passcode.

20. A data storage device, comprising:
a processor;
a memory;
a non-volatile storage medium configured to store user content data;
means, stored in the memory for execution by the processor, for repeatedly and automatically generating a dynamically changing unlock passcode for unlocking the data storage device;
means, stored in the memory for execution by the processor, for receiving, in a synchronization message transmitted from a user device external to the data storage device, a current time value of the user device;
means, stored in the memory for execution by the processor, for performing, based on the current time value, a time synchronization operation to align a time reference value of the data storage device with a corresponding time reference value of the user device;
means, stored in the memory for execution by the processor, for receiving a first passcode including an input passcode provided by the user device, wherein the input passcode is generated externally to the data storage device and synchronously with the generation of the unlock passcode by the data storage device using the time reference value; and
means, stored in the memory for execution by the processor, for providing access to the user content data via a data port of the data storage device, the access being provided in response to the first passcode matching with a second passcode generated by the data storage device, wherein the second passcode includes at least the unlock passcode.

21. A data storage device, comprising:
a data path comprising:
a data port configured to transmit data between a host computer system and the data storage device, wherein the data storage device is configured to register with the host computer system as a block data storage device;
a non-volatile storage medium configured to store user content data; and
a cryptography engine connected between the data port and the non-volatile storage medium and configured to:
use an encryption key to selectively encrypt one or more of:
the user content data stored on the non-volatile storage medium; and
data received from the data port to be stored as user content data on the non-volatile storage medium; and
use a decryption key to selectively decrypt encrypted user content data stored on the non-volatile storage medium; and
an access controller configured to:
provide the encryption key and the decryption key to the cryptography engine;
repeatedly and automatically generate a dynamically changing unlock passcode for unlocking the data storage device;
repeatedly and automatically generate an unlock key by encrypting the encryption key using a currently generated unlock passcode of the data storage device;
receive a first passcode including an input passcode provided by a user device, wherein the user device is configured to generate the input passcode:
externally to the data storage device; and
synchronously with the generation of the unlock passcode by the access controller;
generate, responsive to the first passcode matching with a second passcode generated by the access controller, the decryption key by decrypting an unlock key of the data storage device using the received input passcode;
cause the decryption key to be used in a decryption function of the data storage device to apply the decryption function to a portion of the encrypted user content data; and
return a result of the decryption function to the host computer system via the data port to provide access to the user content data, wherein the encrypted user content data is encrypted by using the encryption key in a corresponding encryption function of the data storage device.

\* \* \* \* \*